(12) United States Patent
DuRee et al.

(10) Patent No.: US 6,351,521 B1
(45) Date of Patent: *Feb. 26, 2002

(54) COMMUNICATIONS TEST SYSTEM

(75) Inventors: Albert Daniel DuRee, Independence, MO (US); William Lyle Wiley, Olathe, KS (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/664,648

(22) Filed: Sep. 19, 2000

Related U.S. Application Data

(63) Continuation of application No. 09/058,642, filed on Apr. 10, 1998.

(51) Int. Cl.[7] .......................... H04M 1/24; H04M 3/08; H04M 3/22
(52) U.S. Cl. .......................... 379/15.01; 379/9; 379/14; 379/15.04
(58) Field of Search .................... 379/1, 15, 27, 379/29, 32, 5, 6, 9–10, 1.01, 10.02, 14, 15.01, 15.02, 15.04, 22.01, 22.02, 27.02, 29.08

(56) References Cited

U.S. PATENT DOCUMENTS

| | | |
|---|---|---|
| 4,201,889 A | 5/1980 | Lawrence et al. |
| 4,310,727 A | 1/1982 | Lawser |
| 4,348,554 A | 9/1982 | Asmuth |

(List continued on next page.)

FOREIGN PATENT DOCUMENTS

| | | |
|---|---|---|
| EP | 0435448 A2 | 11/1990 |
| EP | 0454332 A3 | 4/1991 |
| EP | 91311342.9 | 7/1992 |
| EP | 92307752.3 | 9/1993 |
| JP | 870284896 | 5/1989 |
| JP | 07050057 | 9/1996 |
| WO | WO 94/06251 | 3/1994 |
| WO | WO 95/04436 | 2/1995 |

OTHER PUBLICATIONS

ANSI–TI.111–1992, American National Standard for Telecommunications, "Signaling System No. 7 (SS7)—Message Transfer Part (MTP)," New York, NY.

ANSI–TI.112–1992, American National Standard for Telecommunications, "Signaling System No. 7 (SS7)—Signaling Connection Control Part (SCCP)," New York, NY.

(List continued on next page.)

*Primary Examiner*—Duc Nguyen
(74) *Attorney, Agent, or Firm*—Harley R. Ball; Steven J. Funk; Kevin D. Robb

(57) ABSTRACT

The invention is a test system that gives the user a single point of control to generate calls and run tests on a switching system for use in a communications network. The test system is capable of generating calls through a tandem switching system without using a local access switch. The test system is operationally coupled to the switching system by a signaling link and a call connection. The test system receives a first user request to generate a call. The test system transfers signaling to the switching system over the signaling link to cause the switching system to extend the call connection. The test system receives a second user request to run a test, and applies the test to the call connection. In some embodiments, the test system includes a web server that interfaces with a web browser operated by the user. The web server transfers information for screen displays to the web browser. The web server collects user requests from the web browser to generate calls and run tests. The web server transfers signaling, such as an initial address message, to a signaling point for formatting. The signaling point forwards the signaling to the switching system to generate calls. The web server also transfers a test instruction to test equipment. The test equipment applies the test to the call connection and returns the test result to the web server. The web server displays the test result to the user through the web browser.

93 Claims, 5 Drawing Sheets

U.S. PATENT DOCUMENTS

| | | |
|---|---|---|
| 4,453,247 A | 6/1984 | Suzuki et al. |
| 4,554,659 A | 11/1985 | Blood et al. |
| 4,565,903 A | 1/1986 | Riley |
| 4,683,563 A | 7/1987 | Rouse et al. |
| 4,736,364 A | 4/1988 | Basso et al. |
| 4,748,658 A | 5/1988 | Gopal et al. |
| 4,823,338 A | 4/1989 | Chan et al. |
| 4,853,955 A | 8/1989 | Thorn et al. |
| 4,896,319 A | 1/1990 | Lidinsky et al. |
| 4,916,690 A | 4/1990 | Barri |
| 4,926,416 A | 5/1990 | Weik |
| 4,985,889 A | 1/1991 | Frankish et al. |
| 4,991,204 A | 2/1991 | Yamamoto et al. |
| 4,993,014 A | 2/1991 | Gordon |
| 5,003,584 A | 3/1991 | Benyacar et al. |
| 5,018,191 A | 5/1991 | Catron et al. |
| 5,036,318 A | 7/1991 | Bachhuber et al. |
| 5,048,081 A | 9/1991 | Gavaras et al. |
| 5,058,104 A | 10/1991 | Yonehara et al. |
| 5,067,123 A | 11/1991 | Hyodo et al. |
| 5,084,867 A | 1/1992 | Tachibana et al. |
| 5,089,954 A | 2/1992 | Rago |
| 5,091,903 A | 2/1992 | Schrodi |
| 5,101,404 A | 3/1992 | Kunimoto et al. |
| 5,115,431 A | 5/1992 | Williams et al. |
| 5,163,057 A | 11/1992 | Grupp |
| 5,168,492 A | 12/1992 | Beshai et al. |
| 5,179,556 A | 1/1993 | Turner |
| 5,185,743 A | 2/1993 | Murayama et al. |
| 5,193,110 A | 3/1993 | Jones et al. |
| 5,204,857 A | 4/1993 | Obara |
| 5,216,669 A | 6/1993 | Hofstetter et al. |
| 5,218,602 A | 6/1993 | Grant et al. |
| 5,231,631 A | 7/1993 | Buhrke et al. |
| 5,231,633 A | 7/1993 | Hluchyj et al. |
| 5,233,607 A | 8/1993 | Barwig et al. |
| 5,239,539 A | 8/1993 | Uchida et al. |
| 5,249,178 A | 9/1993 | Kurano et al. |
| 5,251,255 A | 10/1993 | Epley |
| 5,253,247 A | 10/1993 | Hirose et al. |
| 5,255,266 A | 10/1993 | Watanabe et al. |
| 5,258,752 A | 11/1993 | Fukaya et al. |
| 5,258,979 A | 11/1993 | Oomuro et al. |
| 5,268,895 A | 12/1993 | Topper |
| 5,271,010 A | 12/1993 | Miyake et al. |
| 5,274,680 A | 12/1993 | Sorton et al. |
| 5,278,889 A | 1/1994 | Papanicolaou et al. |
| 5,282,244 A | 1/1994 | Fuller et al. |
| 5,285,441 A | 2/1994 | Bansal et al. |
| 5,291,479 A | 3/1994 | Vaziri et al. |
| 5,311,509 A | 5/1994 | Heddes et al. |
| 5,317,562 A | 5/1994 | Nardin et al. |
| 5,323,389 A | 6/1994 | Bitz et al. |
| 5,327,421 A | 7/1994 | Hiller et al. |
| 5,329,308 A | 7/1994 | Binns et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,357,510 A | 10/1994 | Norizuki et al. |
| 5,363,433 A | 11/1994 | Isono |
| 5,365,524 A | 11/1994 | Hiller et al. |
| 5,367,566 A | 11/1994 | Moe et al. |
| 5,373,504 A | 12/1994 | Tanaka et al. |
| 5,375,124 A | 12/1994 | D'Ambrogio et al. |
| 5,377,186 A | 12/1994 | Wegner et al. |
| 5,384,771 A | 1/1995 | Isidoro et al. |
| 5,384,840 A | 1/1995 | Blatchford et al. |
| 5,392,402 A | 2/1995 | Robrock, II |
| 5,394,393 A | 2/1995 | Brisson et al. |
| 5,394,398 A | 2/1995 | Rau |
| 5,414,701 A | 5/1995 | Shtayer et al. |
| 5,418,783 A | 5/1995 | Yamaki et al. |
| 5,420,857 A | 5/1995 | Jurkevich |
| 5,420,858 A | 5/1995 | Marshall et al. |
| 5,420,916 A | 5/1995 | Sekiguchi |
| 5,422,882 A | 6/1995 | Hiller et al. |
| 5,425,090 A | 6/1995 | Orriss |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | La Porta et al. |
| 5,434,981 A | 7/1995 | Lenihan et al. |
| 5,440,563 A | 8/1995 | Isidoro et al. |
| 5,444,713 A | 8/1995 | Backaus et al. |
| 5,446,738 A | 8/1995 | Kim et al. |
| 5,452,297 A | 9/1995 | Hiller et al. |
| 5,453,981 A | 9/1995 | Katsube et al. |
| 5,454,034 A | 9/1995 | Martin |
| 5,457,684 A | 10/1995 | Bharucha et al. |
| 5,463,620 A | 10/1995 | Sriram |
| 5,463,621 A | 10/1995 | Suzuki |
| 5,473,677 A | 12/1995 | D'Amato et al. |
| 5,473,679 A | 12/1995 | La Porta et al. |
| 5,477,537 A | 12/1995 | Dankert et al. |
| 5,479,401 A | 12/1995 | Bitz et al. |
| 5,479,402 A | 12/1995 | Hata et al. |
| 5,479,495 A | 12/1995 | Blumhardt |
| 5,483,527 A | 1/1996 | Doshi et al. |
| 5,485,455 A | 1/1996 | Dobbins et al. |
| 5,495,484 A | 2/1996 | Self et al. |
| 5,504,742 A | 4/1996 | Kakuma et al. |
| 5,506,844 A | 4/1996 | Rao |
| 5,509,010 A | 4/1996 | LaPorta et al. |
| 5,509,123 A | 4/1996 | Dobbins et al. |
| 5,513,178 A | 4/1996 | Tanaka |
| 5,519,707 A | 5/1996 | Subramanian et al. |
| 5,521,910 A | 5/1996 | Matthews |
| 5,522,042 A | 5/1996 | Fee et al. |
| 5,526,414 A | 6/1996 | Bedard et al. |
| 5,530,698 A | 6/1996 | Kozaki et al. |
| 5,533,106 A | 7/1996 | Blumhardt |
| 5,539,815 A | 7/1996 | Samba |
| 5,539,816 A | 7/1996 | Pinard et al. |
| 5,539,884 A | 7/1996 | Robrock, II |
| 5,541,918 A | 7/1996 | Ganmukhi et al. |
| 5,541,926 A | 7/1996 | Saito et al. |
| 5,544,152 A | 8/1996 | Obermanns et al. |
| 5,544,161 A | 8/1996 | Bigham et al. |
| 5,548,580 A | 8/1996 | Buckland |
| 5,550,819 A | 8/1996 | Duault |
| 5,550,914 A | 8/1996 | Clarke et al. |
| 5,563,939 A | 10/1996 | LaPorta et al. |
| 5,566,173 A | 10/1996 | Steinbrecher |
| 5,568,475 A | 10/1996 | Doshi et al. |
| 5,570,368 A | 10/1996 | Murakami et al. |
| 5,577,039 A | 11/1996 | Won et al. |
| 5,579,311 A | 11/1996 | Chopping et al. |
| 5,587,999 A | 12/1996 | Endo |
| 5,592,477 A | 1/1997 | Farris et al. |
| 5,600,640 A | 2/1997 | Blair et al. |
| 5,600,643 A | 2/1997 | Robrock, II |
| 5,627,836 A | 5/1997 | Conoscenti et al. |
| 5,629,930 A | 5/1997 | Beshai et al. |
| 5,635,980 A | 6/1997 | Lin et al. |
| 5,636,210 A | 6/1997 | Agrawal et al. |
| 5,640,446 A | 6/1997 | Everett et al. |
| 5,673,262 A | 9/1997 | Shimizu |
| 5,680,390 A | 10/1997 | Robrock, II |
| 5,703,876 A | 12/1997 | Christie |
| 5,708,702 A | 1/1998 | De Paul et al. |

| | | |
|---|---|---|
| 5,710,769 A | 1/1998 | Anderson et al. |
| 5,825,780 A | 10/1998 | Christie |
| 5,991,301 A | 11/1999 | Christie |
| 6,160,871 A * | 12/2000 | DuRee et al. .................. 379/9 |

OTHER PUBLICATIONS

ANSI–TI.113–1992, American National Standard for Telecommunications, "Signaling System No. 7 (SS7)—Integrated Services Digital Network (ISDN) User Part," New York, NY.

ANSI–TI.113a–1993, American National Standard for Telecommunications, "Signaling System No. 7 (SS7)—Integrated Services Digital Network (ISDN) User Part (Nxdso Multi–Rate Connection)," Washington, D.C.

ANSI–TI.113–1995, American National Standard for Telecommunications, "Signaling System No. 7 (SS7)—Integrated Services Digital Network (ISDN) User Part," New York, NY.

McDysan, David E. AND Spohn, Darren L., ATM Theory And Application, 1994, p. 256: 9.3.1; ATM Layer VPI/VCI Level Addressing.

Choi, Requirements For ATM Trunking, ATM Forum Technical Committee 95–1401, Oct. 2–6, 1995.

Stodola "Circuit Emulation Services Version 2 Baseline," ATM Forum Technical Committee 95–1504, Dec. 11–15, 1995.

Okutani et. al. "VTOA: Reference Configuration—ATM Trunking For Narrowband Services," ATM Forum Technical Committee 95–1364, Oct. 2–6, 1995.

Ohta, S., et al., A Dynamically Controllable ATM Transport Network Based On The Virtual Path Concept, pp. 1272–1276, Communications For The Information Age, Globecom '88, Conference Record, vol. III, Nov. 28–Dec. 1, 1988.

Duault, Proposal For ATM Trunking Options, ATM Forum Technical Committee, 95–1230, Oct. 2–6, 1995.

Schink, "CES As A Flexible Trunking Method", ATM Forum Technical Committee 95–1157, Oct. 2–6, 1995.

Yoneda, "J2 Circuit Emulation Service—Proposal For Changes/Additions To Circuit Emulation Service Interoperability Specification", ATM Forum Technical Committee 95–1136, Oct. 2–6, 1995.

Caves, Proposed modifications to the baseline text (95–0446R2) of the "VTOA—ATM Trunking For Narrowband Services Specification", ATM Forum Technical Committee 95–1134, Oct. 2–6, 1995.

Kumar, "SAA/VTOA Legacy Voice Service At A Native ATM Terminal", ATM Forum Techical Committee 95–0917R1, Oct. 2–6, 1995.

Duault, "Baseline Text For Voice And Telephony Over ATM–ATM Trunking For Narrowband Services", ATM Forum Technical Committee 95–0446R3, Oct. 2–6, 1995.

Chiang, "Proposed Changes to Proxy Signaling Capability", ATM Forum Signaling Working Group 95–0046, Feb. 6–10, 1995.

Amin–Salehi, "Third Party Call Setup For A Video–On–Demand Connection Establishment", ATM Forum Technical Committee 95–0022, Feb. 5–8, 1995.

"ATM At A Glance," Transmission Technologies Access Guide, pp. 40–42, 1993.

Andrews, F., "Switching In A Competitive Market," IEEE Communications Magazine, Jan. 1991.

Atoui, M., "Virtual Private Network Call Processing In The Intelligent Network," pp. 561–565, Chicago, IL, International Conference on Communications, vol. II., 1992.

Bosco, P., et al., "A Laboratory For AIN Service Design And Validation," pp. 566–571, Chicago, International Conference on Communications, vol. II., Jun. 14, 1992.

Cooper, C., et al., "Toward A Broadband Congestion Control Strategy," IEEE Network, The Magazine of Computer Communications, May 1990.

Fujioka, M., et al., "Universal Service Creation And Provision Environment For Intelligent Network," IEEE Communications Magazine, Jan. 1991.

Garrahan, J.J., et al., "Intelligent Network Overview," pp. 30–36, IEEE Communications Magazine, Mar. 1993.

Homa, J., et al., "Intelligent Network Requirements For Personal Communications Services," pp. 70–76, IEEE Communications Magazine, Feb. 1992.

Johnson, M. A., et al., "New Service Testing Functions For Advanced Intelligent Networks," pp. 709–720, 1992, Memphis, TN, IEEE 1992 Network Operations and Management Symposium, vol. III, Apr. 6, 1992.

Minzer, Steven, A Signaling Protocol For Complex Multimedia Services, pp. 1383–1394, IEEE Journal on Selected Areas in Communications vol. 9, No. 9 (ISSN 0733–8716).

Pinkham, G., et al. The Ericsson Approach To Intelligent Networks, pp. 320–324, Hollywood, FL, IEEE Global Telecommunications Conference & Exhibition, Session 10, paragraph 4, vol. I, 1988.

Woodworth, Clark B., et al., "A Flexible Broadband Packet Switch For A Multimedia Integrated Network," pp. 3.2.1–3.2.8, International Conference on Communications, Denver, ICC–91, Jun. 1991.

Yeh, S.Y., et al., The Evolving Intelligent Network Architecture, pp. 835–839, 1990, Hong Kong, IEEE Conference on Computer and Communication Systems.

"IN/B–ISDN Signaling Three Ways Of Integration," Study Group 11, Geneva, ITU—Telecommunication Standardization Sector, Nov. 29—Dec. 17, 1993.

"Interworking B–ISUP and Q.93B for DDI, MSN, TP and SUB," Study Group 11, Geneva, ITU—Telecommunication Standardization Sector, Nov. 29—Dec. 17, 1993.

"Q.2931, Clause 4—Information Elements," Geneva, ITU—Telecommunication Standardization Sector, Nov. 29—Dec. 17, 1993.

"Section 5 Of Q.93B," Study Group 11, Geneva, ITU—Telecommunication Standardization Sector, Nov. 29—Dec. 17, 1993.

"Chapter 6 Of Recommendation Q.93B," Study Group 11, Geneva, ITU—Telecommunication Standardization Sector, Nov. 29—Dec. 17, 1993.

"Clauses 7 And 8 Of Q.2931," Study Group 11, ITU—Telecommunication Standardization Sector, Dec. 1993.

"Revised Q.2931 User Side SDL Diagrams," Study Group 11, ITU—Telecommunication Standardization Sector, Nov. 29—Dec. 17, 1993.

"Annex E Of Recommendation Q.93B," Study Group 11, ITU—Telecommunication Standardization Sector, Nov. 29—Dec. 17, 1993.

"Annex J Of Q.2931," Study Group 11, ITU—Telecommunication Standardization Sector, Dec. 1993.

"Appendix 1/Q.2931: Guidelines For The Use Of Instruction Indicators," Study Group 11, ITU—Telecommunication Standardization Sector, Nov. 29—Dec. 17, 1993.

"Draft Text For Q.2931: Appendix II (Information Items Required For Connection Establishment And Routing In B–ISDN)," Study Group 11, ITU—Telecommunication Standardization Sector.

"General Recommendations On Telephone Switching And Signaling—Intelligent Network/Distributed Functional Plane For Intelligent Network CS–1," ITU–T Recommendation Q.1214, ITU—Telecommunication Standardization Sector.

"Revised Draft Of Q.2650 (DSS2/B–ISUP Interworking Recommendation)," Study Group 11, Geneva, ITU—Telecommunication Standardization Sector, Nov. 29—Dec. 17, 1993.

"Draft Broadband/Narrowband NNI Interworking Recommendation," Study Group 11, Geneva, ITU—Telecommunication Standardization Sector, Dec. 1993.

"Draft Recommendation Q.2761," Study Group 11, Geneva, ITU—Telecommunication Standardization Sector, Nov. 29—Dec. 17, 1993.

"Draft Recommendation Q.2762," Study Group 11, Geneva, ITU—Telecommunication Standardization Sector, Nov. 29—Dec. 17, 1993.

"Clean Final Draft Text For B–ISUP Formats And Codes (Q.2763) In ASN.1," Study Group 11, Geneva, ITU—Telecommunication Standardization Sector, Nov. 29—Dec. 17, 1993.

"Updated Draft Of Q.2764 (BQ.764)," Study Group 11, Geneva, ITU—Telecommunication Standardization Sector, Nov. 29—Dec. 17, 1993.

"Draft Recommendation Q.2650," Study Group 11, Geneva, ITU—Telecommunication Standardization Sector, Nov. 29—Dec. 17, 1993.

"Revised Draft Of Q.2650 (DSS2/ B–ISUP Interworking Recommendation)," Study Group 11, Geneva, ITU—Telecommunication Standardization Sector, Nov. 29—Dec. 17, 1993.

"Draft Text For Q.2931 (CH. 1, 2 AND 3)," Study Group 11, Geneva, ITU—Telecommunication Standardization Sector, Dec. 1993.

"Rec. Q.2931, Annex G—Status Monitoring Of Spcs," Study Group 11, ITU—Telecommunication Standardization Sector, Nov. 29—Dec. 17, 1993.

"Q.2931 Overview," Geneva, ITU—Telecommunication Standardization Sector, Nov. 29—Dec. 17, 1993.

"Final B–ISUP SDLS," Study Group 11, Geneva, ITU—Telecommunication Standardization Sector, Nov. 29—Dec. 17, 1993.

"Revised Q.2931 Network Side SDL Diagrams," Study Group 11, ITU—Telecommunication Standardization Sector, Nov. 29—Dec. 17, 1993.

"Revision Of Recommendation Of Q.850," Geneva, ITU–T SG 11 WP 2, Dec. 2–15, 1993.

"Final Draft Text For Broadband Capability Set 2 Signaling Requirements," Study Group 11 Attachment "D" Special Drafting Meeting, pp. 1–127, Torino, Italy, ITU–T Telecommunications Standardization Sector, Sep. 13–22, 1993.

ITU Draft Recommendation I.363.1, B–IDSN ATM Adaptation Layer (AAL) Specification, Types 1 & 2, Jul. 21, 1995.

Yoshikai, N., et al., "General Arrangements for Interworking Between B–ISDN and 64kbit/s Based ISDN (Draft Recommendation I.580), Study Group 13," ITU–T Telecommunication Standardization Sector, pp. 1–51, (Mar. 7, 1994).

"Editorial Modifications For Draft New ITU–T Recommendation 1.731", Study Group 15, Temporary Document 70 (PLE/15), ITUT, 13–24 Nov. May 1995.

"Draft 1.732", Study Group 15, Temporary Document 40 (PLE/15), ITUT, 13–24 Nov. May 1995.

1.751 Asynchronous Transfer Mode (ATM) Management View Of The Network Element View, Study Group 15, Temporary Document 32 (PLE/15), ITUT, 13–24 Nov. May 1995.

"Annexes B, C, D, F, H and I OF Q.2931", Study Group 11, Temporary Document 2/II–27 C, ITU—Telecommunication Standardization Sector, Nov. 29—Dec. 17, 1993.

"ISCP Baseline Document (VER 3.1)," ITU Telecommunication Standardization Sector, Centre Studi E Laboratori Telecommunicazioni S.p.A., Geneva, Paglialunga, A., 1993.

Batten, A., "Personal Communications Services And The Intelligent Network," British Telecommunications Engineering, vol. 9, Aug. 1990.

Beckman, Richard T. and Matthews, Joseph R., "Proposal For A Physical Architecture Based On The Harmonized Functional Architecture," Committee T1 Contribution T1S1.5/95–027, Bellcore, Feb. 20,1995.

Buhrke, Proposed Unified Functional Model, T1S1.5/95–036, Feb. 1995.

Faynberg, I., et al., "The Support Of Network Interworking And Distributed Context Switching In The In Service Data Function Model," pp. 11–16, 2nd Colloque International, ICIN 92, Mar. 1992.

Fukazawa, M., et al., "Intelligent Network Call Model For Broadband ISDN," pp. 30.6.1–30.6.5, Fujitsu Laboratories Ltd., Japan.

Miller, P., "Intelligent Network/2: A Flexible Framework For Exchange Services," Bell Communications Research Exchange, vol. 3, Issue 3, May/Jun. 1987.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

Russo, E.G., et al., "Intelligent Network Platforms In The U.S.," pp. 26–43, AT&T Technical Journal, 1991.

Sprague, David, "MTP Level–3 Gateway Stp Release 3.2.0," pp. 1–48, TEKELEC, Aug. 4, 1995.

Van Den Broek, W., et al., "Race 2066—Functional Models Of UMTS And Integration Into The Future Networks," pp. 165–172, Electronics & Communications Engineering Journal, Jun. 1993.

"Network Signaling," Telephony, TCX12004, University of Excellence, pp 5.8–5.17, Oct. 21, 1991.

"A Technical Report On Speech Packetization," Document T1A1/94—Prepared by T1A1.7, Working Group on Specialized Signal Processing.

* cited by examiner

COMMUNICATIONS TEST SYSTEM

RELATED APPLICATIONS

This application is a continuation of prior application Ser. No. 09/058,642, entitled "Communications Test System" filed Apr. 10, 1998, currently pending, incorporated by referenced into this application.

FIELD OF THE INVENTION

The invention is related to the field of communications test systems, and in particular, to a test call system and a graphical user interface that inter-operate to run tests on a switching system.

BACKGROUND

Switching systems establish call connections through a communications network in response to signaling. On a typical long distance call, the caller transmits dialed digits to a local access switch. The local access switch processes the dialed digits and extends the call connection to a tandem switch. The local access switch also transfers signaling to the tandem switch. The tandem switch processes the signaling to extend the call connection and transfer signaling to a tandem switch in the long distance network. This process is repeated until the call connection is extended to the local access switch that serves the called party. Thus, the caller and the called party are each connected to their respective local access switch. The two local access switches are connected to each other through a series of tandem switches.

The tandem switches are complex systems that require significant testing before they are deployed in a network. New types of tandem switching systems are being developed to take advantage of advanced technologies. For example, distributed switching systems that use external call processors and Asynchronous Transfer Mode (ATM) network elements are being developed. It is critical that these advanced systems undergo thorough testing before they are deployed in the network.

Testing typically entails the generation of calls through the switching system, so tests can be applied to the line during the calls. The calls are generated by establishing a call connection to the switching system and transferring signaling to the switching system. The switching system extends the call connection in response to the signaling. After the testing is complete, the call connection is torn down by transferring additional signaling to the switching system.

At present, two separate systems are required to test tandem switches. A local access switch is required to generate and transfer the signaling to the tandem switch. Test equipment is then required to apply the test to the line. The user must control the local access switch to generate and transmit signaling to the tandem switch. The user must separately control the test equipment to apply the test.

The current testing configuration and process is lacking. The local access switch is complex and expensive. In addition, the user must separately control the local access switch and the test equipment. There is a need for a test system that allows a user to run tests on a tandem switching system without requiring a local access switch and without requiring the control of separate systems.

SUMMARY

The invention solves the above problem by providing a test system that gives the user a single point of control to generate calls and run tests on a switching system for use in a communication network. The test system is capable of generating calls through a tandem switching system without using a local access switch.

The test system is operationally coupled to the switching system by a signaling link and a call connection. The test system receives a first user request to generate a call. The test system transfers signaling to the switching system over the signaling link to cause the switching system to extend the call connection. The test system receives a second user request to run a test, and applies the test to the call connection.

In some embodiments, the test system includes a web server that interfaces with a web browser operated by the user. The web server transfers information for screen displays to the web browser. The web server collects user requests from the web browser to generate calls and run tests. The web server transfers signaling, such as an initial address message, to a signaling point for formatting. The signaling point forwards the signaling to the switching system to generate calls. The web server also transfers a test instruction to test equipment. The test equipment applies the test to the call connection and returns the test result to the web server. The web server displays the test result to the user through the web browser.

DETAILED DESCRIPTION

Figure 1:
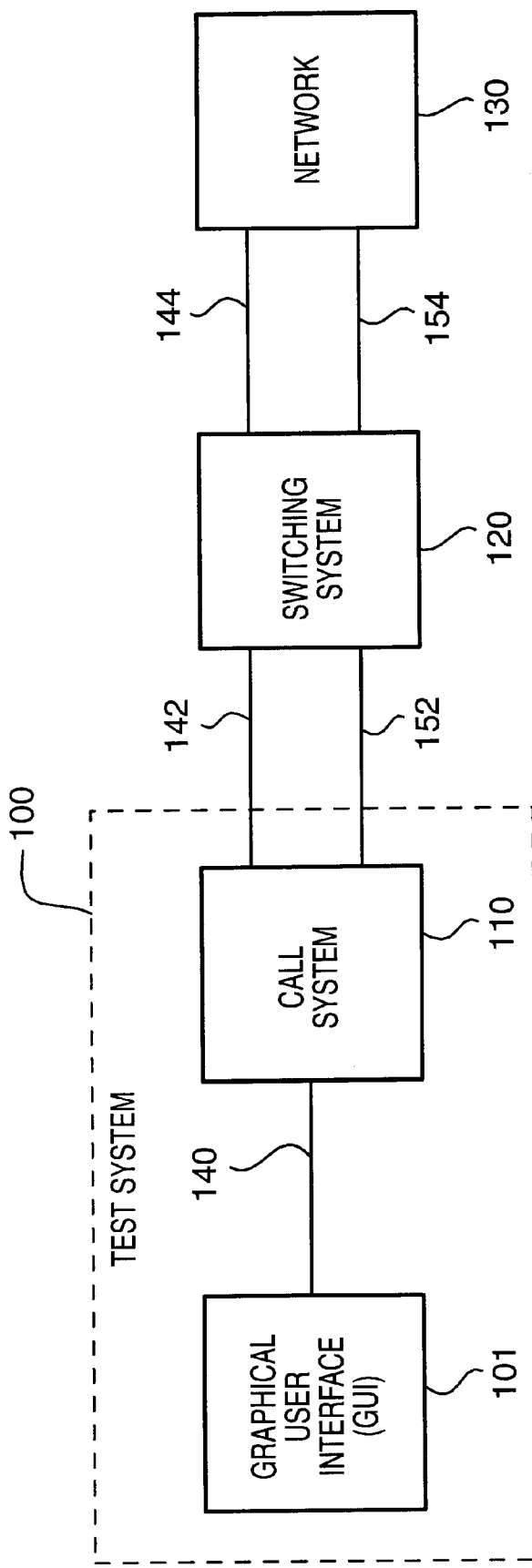
FIG. 1 is a block diagram of the test system in an embodiment of the invention.
Figure 2:
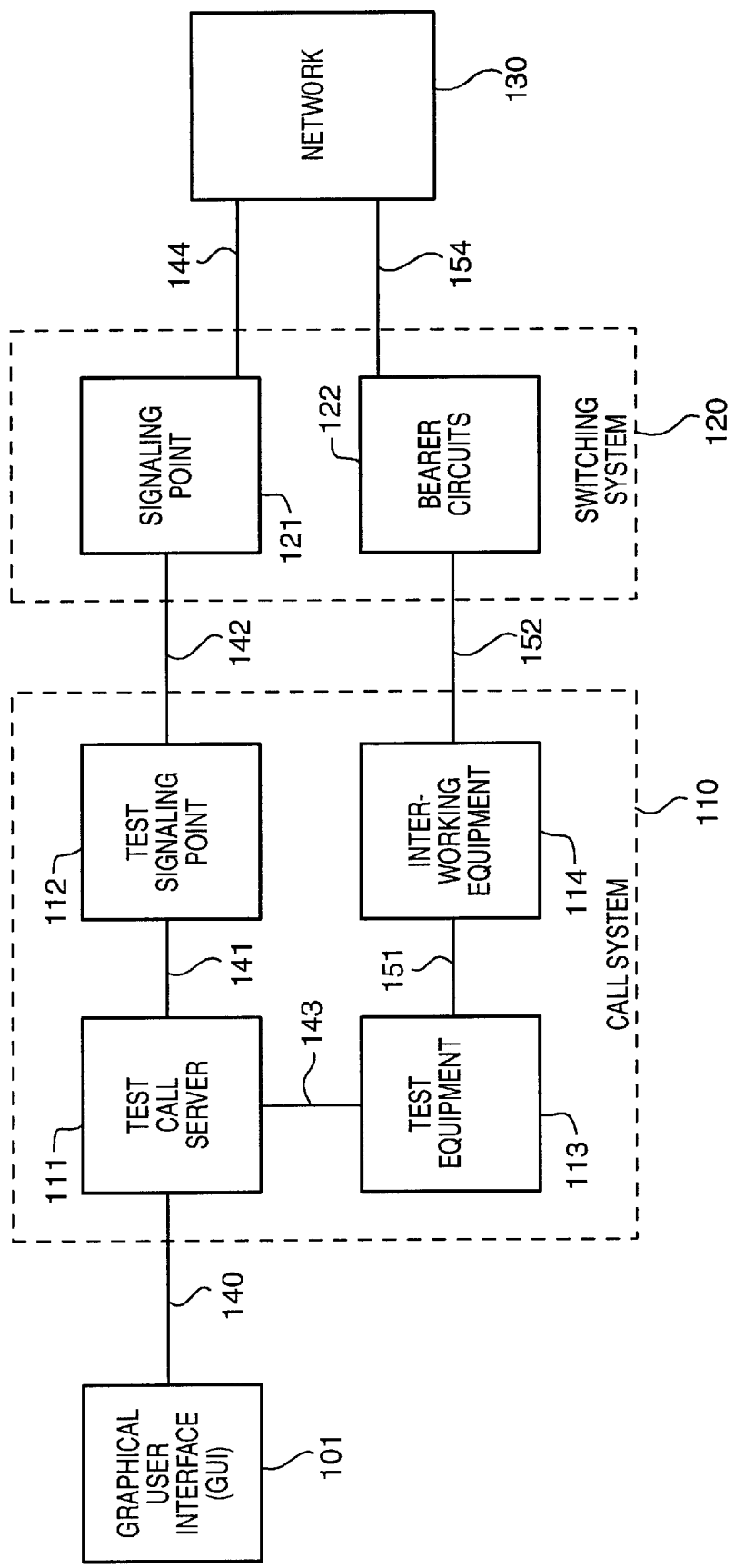
FIG. 2 is a block diagram of the call system and switching system in an embodiment of the invention.

Test System Configuration—FIGS. 1–2

FIG. 1 depicts a test system 100, a switching system 120, and a network 130. The test system 100 is comprised of a Graphical User Interface (GUI) 101 and a call system 110 connected by a data link 140. The call system 110 is connected to the switching system 120 by a signaling link 142 and a bearer connection 152. The switching system 120 is connected to the network 130 by a signaling link 144 and a bearer connection 154.

The GUI 101 could be any terminal that can display graphical screens to a user and allow the user to make selections and inputs. In some embodiments of the invention, the GUI 101 is a conventional personal computer running a conventional web browser and the graphical screens are generated by executing Java applets. The GUI 101 allows the user to connect to the call system 110 over the data link 140. The GUI 101 also allows the user to direct the call system 110 to generate or receive calls, to run tests and return results, and to release calls.

The call system 110 is a computer system that provides menus to the user through the GUI 101. The menus could be comprised of Java applets. The call system 110 generates and releases calls through the switching system 120 by transferring signaling over the signaling link 142. In some embodiments of the invention, the signaling is Signaling System #7 (SS7). Those skilled in the art will recognize other forms of signaling that could be used in the context of the invention, such as C7, Integrated Services Digital Network (ISDN), Asynchronous Transfer Mode (ATM), or TR-303. In some embodiments of the invention, the bearer connections 152 and 154 include a DS0. Those skilled in the art will also recognize other forms of bearer connections that could be used in the context of the invention, such as ISDN, ATM, Time Division Multiplex (TDM), superframe, or frame relay. In some embodiments of the invention, the signaling links and the bearer connections could be combined into a single communications path.

The switching system 120 could be any system that extends the bearer connection 152 in response to signaling. The switching system 120 extends the bearer connection 152 to the bearer connection 154 and transmits signaling over the signaling link 144. Advantageously, the switching system 120 could be a tandem switching system that operates between two local access switches. One example of a tandem switching system is a class 4 switch, such as the DMS-250 provided by Nortel.

The switching system could also be a distributed system comprised of a signaling processor and a network element where the network element could be an ATM multiplexer and/or ATM switch. Such a system is disclosed in U.S. patent applications: Ser. No. 08/568,551, entitled "Method, System, and Apparatus for Telecommunications Control"; Ser. No. 08/525,897, entitled "Broadband Communications System"; Ser. No. 08/525,050, entitled "System for Managing Telecommunications"; and Ser. No. 09/027,008, entitled "System and Method for Connecting a Call with an Interworking System."

The network 130 could be any network operational to receive signaling and a bearer connection from the switching system 120. Examples of the network 130 include a TDM network or an ATM network. In some embodiments of the invention, the switching system 120 can originate and terminate calls without the network 130. This would be the case if the call origination and termination are directly connected to the switching system 120.

FIG. 2 depicts the call system 110 and the switching system 120 in greater detail. The call system 110 is comprised of a test call server 111, a test signaling point 112, test equipment 113, and an interworking unit 114. The switching system 120 is comprised of a signaling point 121 and bearer circuits 122. The switching system 120 typically includes other elements, such a processor and matrix, that are omitted for clarity.

The GUI 101 is connected to the test call server over the data link 140. The test call server is connected to the test signaling point 112 by a data link 141. The test signaling point 112 is connected to the signaling point 121 by a signaling link 142. The signaling point 142 is connected to the network 130 by the signaling link 144. In some embodiments of the invention, the signaling link 142 could be an SS7 F link and the signaling link 144 could be SS7 A links to a Signal Transfer Point (STP) in the network 130.

The test call server 111 is connected to the test equipment 113 by a data link 143. In some embodiments of the invention, the data link 143 is an Ethernet local area network connection transferring ASCII test instructions. The test equipment 113 is connected to the interworking equipment 114 by a bearer connection 151. The interworking equipment 114 is connected to the bearer circuits 122 by a bearer connection 152. The bearer circuits 122 are connected to the network 130 by a bearer connection 154. The bearer connections 151, 152, and 154 are typically full duplex connections. In some embodiments of the invention, the bearer connection 151 is a T1 transporting a DS0, and the bearer connection 152 is an OC-3 transporting the DS0. A Circuit Identification Code (CIC) identifies the DS0.

The test call server 111 provides test options to the user through the GUI 101. In some embodiments of the invention, the test call server 111 is a conventional web server. The test call server 111 generates and releases calls through the switching system 120 by transferring signaling to the test signaling point 112. The test call server 111 also directs the test equipment 113 to run tests selected by the user.

The test signaling point 112 formats the signaling from the test call server 111 and forwards the signaling to the signaling point 121. The test signaling point 112 also receives signaling from the signaling point 121 and forwards the signaling to the test call server 111. If SS7 signaling is used, then the test signaling point 112 applies Message Transfer Part (MTP) functionality to the signaling. In some embodiments of the invention, the test signaling point 112 is a single-link signaling point such as the ONE-LINK SPECTRA provided by INET of Plano, Tex.

The test equipment 113 runs tests over the bearer connection 151 in response to test instructions from test call server 111. Some examples of tests are bit error rate, analog voice, data pattern, and echo return. Those skilled in the art will recognize many other tests that could also be performed by the test equipment 113. One example of the test equipment 113 is the FIREBERD 310 provided by Telecommunications Technology Corporation of Germantown, Md.

The interworking unit 114 maps the bearer connection 151 from the test equipment 113 to the bearer connection 152 to the switching system 120. If the bearer connections 151 and 152 are equivalent and do not need mapping, then the interworking equipment 114 can be omitted. If the bearer connection 151 is a T1 transporting a DS0 and the bearer connection 152 is an OC-3 transporting the DSO, then an example of the interworking equipment 114 is the TITAN 3/1 Digital Cross-Connect provided by Tellabs of Lisle, Ill.

Figure 3:
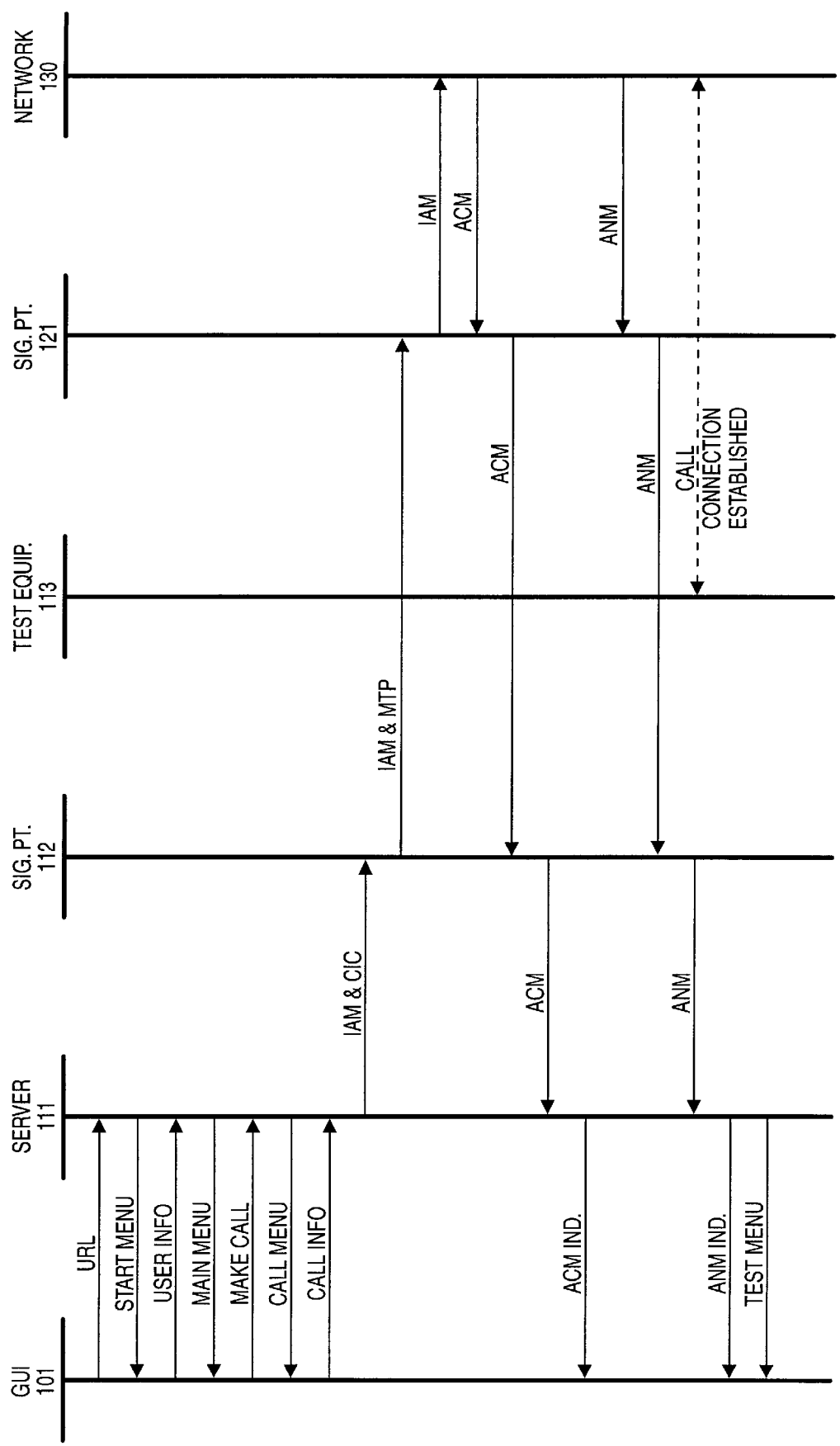
FIGS. 3–5 are process diagrams for an embodiment of the invention.
Figure 4:
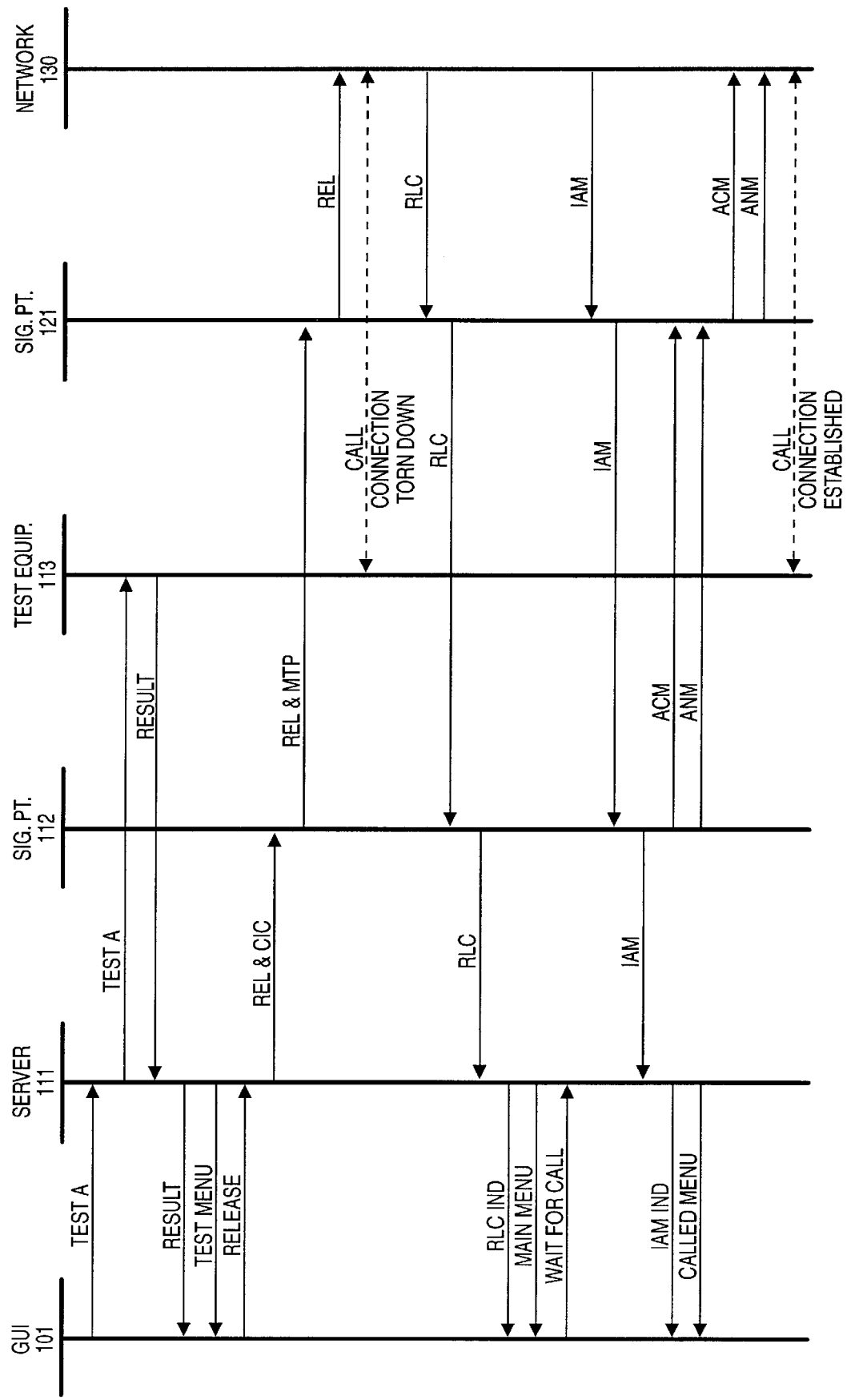
Figure 5:
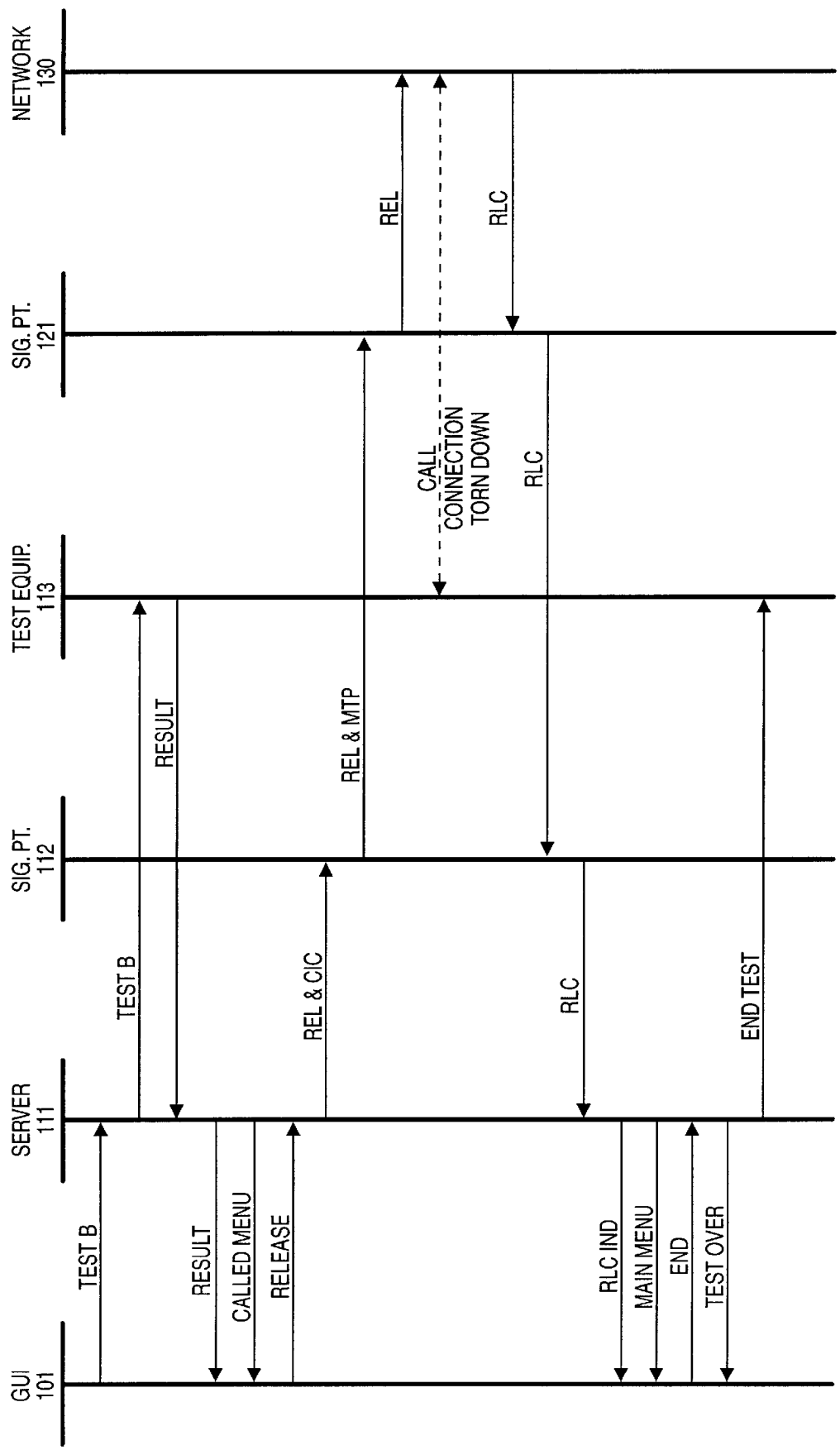

System Operation FIGS. 3–5

FIGS. 3–5 depict the operation of a specific configuration of the invention using a web user interface and SS7 signaling. The invention is not restricted to this exact configuration or operation. Those skilled in the art will appreciate numerous variations and substitutions that can be made that do depart from the scope of the invention.

The testing begins when the user enters the Uniform Resource Locator (URL) of the server 111 into the GUI 101. The GUI 101 connects to the server 111, and the server 111 returns a start menu that requests a user password and a CIC. The user enters the password and the CIC into the GUI 101, and the GUI 101 transfers the user information to the server 111. The server 111 checks the password and the CIC. If the password is legitimate and the CIC is idle, then the server 111 returns a main menu to the GUI 101. The main menu allows the user to select: 1) make a call, 2) wait for a call, or 3) end the session. The GUI transfers the user selection to the server 111.

If the user wants to make a call, then the server 111 returns a call menu to the GUI 101. The call menu allows the user return to the main menu or to input call information, such as: 1) the caller's number, 2) the called number, and 3) the bearer type. Examples of bearer type are voice, 56K data, and 64K data. The GUI 101 transfers the call information to the server 111. The server generates an SS7 Initial Address Message (IAM) from the call information and sends the IAM, along with the CIC, to the test signaling point 112. The test signaling point 112 applies MTP to the IAM based on the CIC and forwards the IAM to the signaling point 121.

The switching s system 120 processes the IAM and typically transfers an IAM for the call to the network 130. The switching system establishes a call connection from the DS0 represented by the CIC through the bearer circuits 122 to the network 130 in response to the IAM.

An SS7 Address Complete Message (ACM) is typically received from the network 130 after the IAM. The ACM is passed to the server 111 through the signaling points 112 and 121. The server 111 sends an ACM indication to the GUI 101. An SS7Answer Message (ANM) is typically received from the network 130 after the ACM and is passed to the server 111 through the signaling points 112 and 121. The ANM indicates that the called party has answered and the call connection is established.

After the call is established, the server 111 sends a test menu to the GUI 101. The test menu allows the user to select tests to run on the call, or to release the call and return to the main menu. The GUI 101 transfers a user request for "TEST A" to the server 111. The server 111 transfers a test instruction to the test equipment identifying the requested test. The test equipment 112 runs the test and returns the test result to the server 111. The server 111 provides the test result to the GUI 101 along with the test menu. The GUI 101 then transfers the next user selection to the server 111.

If the user selects call release and return to main menu, then the server 111 generates a Release message (REL) and transfers the REL and CIC to the signaling point 112. The signaling point 112 applies MTP based on the CIC and forwards the REL to the signaling point 121. The signaling point 121 forwards the REL to the network 130. The switching system 120 tears down the call connection based on the REL. An SS7 Release Complete (RLC) is typically received from the network 130 in response to an REL. The RLC is passed to the server 111 through the signaling points 112 and 121. The server 111 provides an RLC indication and the main menu to the GUI 101.

If the user selects the wait for call option from the main menu, then the GUI 101 transfers the user selection to the server 111. The server 111 awaits the call. The incoming call is initiated by an incoming IAM from the network 130. The IAM is passed to the server 111 through the signaling points 112 and 121. The signaling point 120 automatically returns an ACM and an ANM to the signaling point 121 for transfer to the network 130. The switching system 120 establishes a call connection over the DS0 to the test equipment 113 in response to the incoming IAM.

The server 111 sends a called menu to the GUI 101. The called menu allows the user to select a test or to release the call and return to the main menu. If the user selects "TEST B", then the GUI 101 provides the user selection to the server 111. The server 111 sends a test instruction to the test equipment 113 to perform the selected test. The test equipment 113 runs the selected test and returns the test result to the server 111. The server 111 sends the test result and the called menu to the GUI 101.

If the user selects call release and return to main menu, then the server 111 generates an REL and transfers the REL and CIC to the signaling point 112. The signaling point 112 applies MTP based on the CIC and forwards the REL to the signaling point 121. The signaling point 121 forwards the REL to the network 130. The switching system 120 tears down the call connection based on the REL. An RLC is typically received from the network 130 in response to an REL. The RLC is passed to the server 111 through the signaling points 112 and 121. The server 111 provides an RLC indication and the main menu to the GUI 101.

If the user selects end session, then the GUI 101 sends the user selection to the server 111. The server 111 sends a session over indication to the GUI 101 and sends a test instruction to the test equipment indicating that the test is over. The GUI 101 disconnects from the server 111 and the test equipment 113 de-allocates the CIC.

Those skilled in the art will appreciate variations of the above-described embodiments that fall within the scope of the invention. As a result, the invention is not limited to the specific embodiments discussed above, but only by the following claims and their equivalents.

What is claimed is:

1. A method for operating a test server to test a switching system for use in a communications network, wherein the test server is operationally coupled to a graphical user interface and test equipment and wherein the test equipment is operationally coupled to the switching system by a call connection and the test server is connected to the switching system by a signaling link, the method comprising:

transferring information for a screen display from the test server to the graphical user interface;

in the test server, receiving a first user request to generate a call in response to the screen display;

processing the first user request in the test server to generate signaling for the call wherein the signaling causes the switching system to extend the call connection;

transmitting the signaling from the test server for the switching system over the signaling link;

in the test server, receiving a second user request to run a test;

processing the second user request in the test server to generate a test instruction to apply the test to the call connection; and transmitting the test instruction from the test server for the test equipment.

2. The method of claim 1 wherein the information comprises a start menu requesting a user password and a circuit identification code.

3. The method of claim 1 further comprising:

receiving a user password from the graphical user interface into the test server in response to the screen display; and checking the user password in the test server.

4. The method of claim 1 further comprising:

receiving a circuit identification code from the graphical user interface into the test server in response to the screen display; and checking the circuit code identification in the test server.

5. The method of claim 1 wherein the information comprises a main menu allowing a user to make the call, wait for the call, or end a session.

6. The method of claim 1 further comprising receiving a caller number from the graphical user interface into the test server in response to the screen display.

7. The method of claim 1 further comprising receiving a called number from the graphical user interface into the test server in response to the screen display.

8. The method of claim 1 further comprising receiving a bearer type from the graphical user interface into the test server in response to the screen display.

9. The method of claim 1 wherein the signaling comprises an initial address message.

10. The method of claim 9 wherein the initial address message comprises a circuit identification code.

11. The method of claim 1 further comprising receiving an address complete message into the test server.

12. The method of claim 11 further comprising transferring an address complete message indication from the test server to the graphical user interface.

13. The method of claim 1 further comprising receiving an answer message into the test server.

14. The method of claim 13 further comprising transferring an answer message indication from the test server to the graphical user interface.

15. The method of claim 1 wherein the test equipment applies the test in response to the test instruction.

16. The method of claim 1 further comprising receiving a test result from the test equipment into the test server.

17. The method of claim 16 further comprising transferring the test result from the test server to the graphical user interface.

18. The method of claim 1 wherein the test is a bit error rate test.

19. The method of claim 1 wherein the test is an analog voice test.

20. The method of claim 1 wherein the test is a data pattern test.

21. The method of claim 1 wherein the test is an echo return test.

22. The method of claim 1 further comprising:
receiving a release call instruction from the graphical user interface into the test server in response to the screen display;
generating a release message in the test server based on the release call instruction; and
transmitting the release message from the test server for the switching system.

23. The method of claim 1 further comprising receiving a release complete message into the test server.

24. The method of claim 21 further comprising transferring a release complete message indication from the test server to the graphical user interface.

25. The method of claim 1 further comprising receiving a wait for call instruction from the graphical user interface into the test server in response to the screen display.

26. The method of claim 1 further comprising receiving an initial address message into the test server.

27. The method of claim 1 further comprising receiving an end test instruction from the graphical user interface into the test server in response to the screen display.

28. The method of claim 1 further comprising transferring a test session ended indication from the test server to the graphical user interface.

29. The method of claim 1 wherein the graphical user interface is a computer with a web browser and wherein the test server is a web server.

30. The method of claim 1 wherein the switching system is a tandem switching system.

31. The method of claim 1 wherein the test server does not include a local access switch.

32. A software product for operating a test server to test a switching system for use in a communications network, wherein the test server is operationally coupled to a graphical user interface and test equipment and wherein the test equipment is operationally coupled to the switching system by a call connection and the test server is connected to the switching system by a signaling link, comprising:
test server software operational when executed by a processor to direct the processor to transfer information for a screen display from the test server to the graphical user interface, receive a first user request to generate a call in response to the screen display, process the first user request to generate signaling for the call wherein the signaling causes the switching system to extend the call connection, transmit the signaling from the test server for the switching system over the signaling link, receive a second user request to run a test, process the second user request to generate a test instruction to apply the test to the call connection, and transmit the test instruction from the test server for the test equipment; and
a software storage medium operational to store the test server software.

33. The software product of claim 32 wherein the information comprises a start menu requesting a user password and a circuit identification code.

34. The software product of claim 32 wherein the test server software is operational when executed by the processor to direct the processor to receive a user password from the graphical user interface into the test server in response to the screen display and check the user password in the test server.

35. The software product of claim 32 wherein the test server software is operational when executed by the processor to direct the processor to receive a circuit identification code from the graphical user interface into the test server in response to the screen display and check the circuit code identification in the test server.

36. The software product of claim 32 wherein the information comprises a main menu allowing a user to make the call, wait for the call, or end a session.

37. The software product of claim 32 wherein the test server software is operational when executed by the processor to direct the processor to receive a caller number from the graphical user interface into the test server in response to the screen display.

38. The software product of claim 32 wherein the test server software is operational when executed by the processor to direct the processor to receive a called number from the graphical user interface into the test server in response to the screen display.

39. The software product of claim 32 wherein the test server software is operational when executed by the processor to direct the processor to receive a bearer type from the graphical user interface into the test server in response to the screen display.

40. The software product of claim 32 wherein the signaling comprises an initial address message.

41. The software product of claim 40 wherein the initial address message comprises a circuit identification code.

42. The software product of claim 32 wherein the test server software is operational when executed by the processor to direct the processor to receive an address complete message into the test server.

43. The software product of claim 42 wherein the test server software is operational when executed by the processor to direct the processor to transfer an address complete message indication from the test server to the graphical user interface.

44. The software product of claim 32 wherein the test server software is operational when executed by the processor to direct the processor to receive an answer message into the test server.

45. The software product of claim 44 wherein the test server software is operational when executed by the processor to direct the processor to transfer an answer message indication from the test server to the graphical user interface.

46. The software product of claim 32 wherein the test equipment applies the test in response to the test instruction.

47. The software product of claim 32 wherein the test server software is operational when executed by the processor to direct the processor to receive a test result from the test equipment into the test server.

48. The software product of claim 47 wherein the test server software is operational when executed by the processor to direct the processor to transfer the test result from the test server to the graphical user interface.

49. The software product of claim 32 wherein the test is a bit error rate test.

50. The software product of claim 32 wherein the test is an analog voice test.

51. The software product of claim 32 wherein the test is a data pattern test.

52. The software product of claim 32 wherein the test is an echo return test.

53. The software product of claim 32 wherein the test server software is operational when executed by the processor to direct the processor to receive a release call instruction from the graphical user interface into the test server in response to the screen display, generate a release message in the test server based on the release call instruction, and transmit the release message from the test server for the switching system.

54. The software product of claim 32 wherein the test server software is operational when executed by the processor to direct the processor to receive a release complete message into the test server.

55. The software product of claim 32 wherein the test server software is operational when executed by the processor to direct the processor to transfer a release complete message indication from the test server to the graphical user interface.

56. The software product of claim 32 wherein the test server software is operational when executed by the processor to direct the processor to receive a wait for call instruction from the graphical user interface into the test server in response to the screen display.

57. The software product of claim 32 wherein the test server software is operational when executed by the processor to direct the processor to receive an initial address message into the test server.

58. The software product of claim 32 wherein the test server software is operational when executed by the processor to direct the processor to receive an end test instruction from the graphical user interface into the test server in response to the screen display.

59. The software product of claim 32 wherein the test server software is operational when executed by the processor to direct the processor to transfer a test session ended d indication from the test server to the graphical user interface.

60. The software product of claim 32 wherein the graphical user interface is a computer with a web browser and wherein the test server is a web server.

61. The software product of claim 32 wherein the switching system is a tandem switching system.

62. The software product of claim 32 wherein the test server does not include a local access switch.

63. A test server for testing a switching system for use in a communications network, wherein the test server is operationally coupled to a graphical user interface and test equipment and wherein the test equipment is operationally coupled to the switching system by a call connection and the test server is connected to the switching system by a signaling link, the test server comprising:

a processor configured to transfer information for a screen display to a test interface, receive a first user request to generate a call in response to the screen display, process the first user request to generate signaling for the call wherein the signaling causes the switching system to extend the call connection, transmit the signaling to the test interface, receive a second user request to run a test, process the second user request to generate a test instruction to apply the test to the call connection, and transmit the test instruction to the test interface; and the test interface coupled to the processor, the graphical user interface, and the test equipment and configured to transfer the information for the screen display from the processor to the graphical user interface, transfer the first user request from the graphical user interface to the processor, transfer the signaling from the processor for the switching system over the signaling link, transfer the second user request from the graphical user interface to the processor, transfer the test instruction from the processor for the test equipment.

64. The test server of claim 63 wherein the information comprises a start menu requesting a user password and a circuit identification code.

65. The test server of claim 63 wherein:

the processor is configured to receive a user password in response to the screen display and check the user password in the test server; and the test interface is configured to transfer the user password from the graphical user interface to the processor.

66. The test server of claim 63 wherein:

the processor is configured to receive a circuit identification code in response to the screen display and check the circuit code identification; and the test interface is configured to transfer the circuit identification code from the graphical user interface to the processor.

67. The test server of claim 63 wherein the information comprises a main menu allowing a user to make the call, wait for the call, or end a session.

68. The test server of claim 63 wherein:

the processor is configured to receive a caller number in response to the screen display; and the test interface is configured to transfer the caller number from the graphical user interface to the processor.

69. The test server of claim 63 wherein:

the processor is configured to receive a called number in response to the screen display; and the test interface is configured to transfer the called number from the graphical user interface to the processor.

70. The test server of claim 63 wherein:

the processor is configured to receive a bearer type in response to the screen display; and the test interface is configured to transfer the bearer type from the graphical user interface to the processor.

71. The test server of claim 63 wherein the signaling comprises an initial address message.

72. The test server of claim 71 wherein the initial address message comprises a circuit identification code.

73. The test server of claim 63 wherein:

the processor is configured to receive an address complete message; and the test interface is configured to transfer the address complete message from the switching system to the processor.

74. The test server of claim 73 wherein:

the processor is configured to transfer an address complete message indication to the test interface; and the test interface is configured to transfer the address complete message indication from the processor to the graphical user interface.

75. The test server of claim 63 wherein:

the processor is configured to receive an answer message; and the test interface is configured to transfer the answer message from the switching system to the processor.

76. The test server of claim 75 wherein:

the processor is configured to transfer an answer message indication to the test interface; and the test interface is configured to transfer the answer message indication from the processor to the graphical user interface.

77. The test server of claim 63 wherein the test equipment applies the test in response to the test instruction.

78. The test server of claim 63 wherein:

the processor is configured to receive a test result; and the test interface is configured to transfer the test result from the test equipment to the processor.

79. The test server of claim 78 wherein:

the processor is configured to transfer the test result to the test interface; and the test interface is configured to transfer the test result from the processor to the graphical user interface.

80. The test server of claim 63 wherein the test is a bit error rate test.

81. The test server of claim 63 wherein the test is an analog voice test.

82. The test server of claim 63 wherein the test is a data pattern test.

83. The test server of claim 63 wherein the test is an echo return test.

84. The test server of claim 63 wherein:

the processor is configured to receive a release call instruction in response to the screen display, generate a release message based on the release call instruction, and transmit the release message to the test interface; and the test interface is configured to transfer the release call instruction from the graphical user interface to the processor and transfer the release message from the processor to the switching system.

85. The test server of claim 63 wherein:

the processor is configured to receive a release complete message; and the test interface is configured to transfer the release complete message from the switching system to the processor.

86. The test server of claim 85 wherein:

the processor is configured to transfer a release complete message indication to the test interface; and the test interface is configured to transfer the release complete message indication from the processor to the graphical user interface.

87. The test server of claim 63 wherein:

the processor is configured to receive a wait for call instruction in response to the screen display; and the test interface is configured to transfer the wait for call instruction from the graphical user interface to the processor.

88. The test server of claim 63 wherein:

the processor is configured to receive an initial address message; and the test interface is configured to transfer the an initial address message from the switching system to the processor.

89. The test server of claim 63 wherein:

the processor is configured to receive an end test instruction in response to the screen display; and the test interface is configured to transfer the end test instruction from the graphical user interface to the processor.

90. The test server of claim 63 wherein:

the processor is configured to transfer a test session ended indication to the test interface; and the test interface is configured to transfer the test session ended indication from the processor to the graphical user interface.

91. The test server of claim 63 wherein the graphical user interface is a computer with a web browser and wherein the test server is a web server.

92. The test server of claim 63 wherein the switching system is a tandem switching system.

93. The test server of claim 63 wherein the test server does not include a local access switch.

* * * * *